(12) United States Patent
Liu

(10) Patent No.: US 7,222,874 B1
(45) Date of Patent: May 29, 2007

(54) REAR WHEEL SYNCHRONOUS BRAKE SYSTEM FOR PUSHCART

(76) Inventor: Ssu-Liu Liu, 2F., No. 44, Lane 11, Kung Fu N. Rd., Taipei (TW)

( * ) Notice: Subject to any disclaimer, the term of this patent is extended or adjusted under 35 U.S.C. 154(b) by 184 days.

(21) Appl. No.: 11/135,393

(22) Filed: May 24, 2005

(51) Int. Cl.
| B62B 9/00 | (2006.01) |
| B62B 3/00 | (2006.01) |
| B62B 5/04 | (2006.01) |
| B62B 9/08 | (2006.01) |
| B60T 1/00 | (2006.01) |
| B62L 3/00 | (2006.01) |

(52) U.S. Cl. .............. 280/642; 280/47.34; 280/47.38; 188/19; 188/20; 188/21; 188/24.14; 188/24.15; 188/64.16; 188/24.22; 188/77 R; 188/77 W

(58) Field of Classification Search .............. 280/642, 280/47.34, 47.38; 188/19, 20, 21, 24.14, 188/24.15, 24.16, 24.22, 77 R, 77 W
See application file for complete search history.

(56) References Cited

U.S. PATENT DOCUMENTS

| 4,091,896 A * | 5/1978 | Wieland et al. ............. 188/166 |
| 4,179,013 A * | 12/1979 | Kine ............................. 188/26 |
| 4,310,972 A * | 1/1982 | Isberg et al. .................. 30/382 |
| 4,644,816 A * | 2/1987 | Cockburn .................. 74/502.2 |
| 5,277,436 A * | 1/1994 | Frank et al. ................. 280/5.2 |
| 5,390,943 A * | 2/1995 | Hedrick ................... 280/47.24 |
| 5,845,539 A * | 12/1998 | Huang ........................ 74/489 |
| 6,209,687 B1 * | 4/2001 | Hundley .................. 188/24.16 |
| 6,918,451 B2 * | 7/2005 | Nagashima et al. ........ 173/221 |

* cited by examiner

Primary Examiner—Christopher P. Ellis
Assistant Examiner—John R. Olszewski
(74) Attorney, Agent, or Firm—Troxell Law Office, PLLC

(57) ABSTRACT

A rear wheel synchronous brake system used in a pushcart such as a baby jogging stroller is disclosed to include two rear brakes respectively coupled to the two rear wheels of the baby jogging stroller, a hand control unit mounted on the handle of the baby jogging stroller at the top, and two brake lines coupled between the brake lever of the hand control unit and the two rear brakes for driving the rear brakes to brake the two rear wheels of the baby jogging stroller synchronously when the user pulling the brake lever.

5 Claims, 20 Drawing Sheets

US 7,222,874 B1

REAR WHEEL SYNCHRONOUS BRAKE SYSTEM FOR PUSHCART

BACKGROUND AND SUMMARY OF THE INVENTION

The present invention relates to a pushcart and more specifically, to a rear wheel synchronous brake system for pushcart that can conveniently be operated to synchronously stop the two rear wheels of the pushcart. The present invention is practical for use in a push card having a front flywheel.

A baby jogging stroller or baby stroller has at least one front wheel and two rear wheels. A baby jogging stroller is designed to carry a baby or young child for pushing by a person who is jogging. A baby stroller is a small carriage in which a baby or child is pushed around. A regular three-wheel type baby cart includes one front wheel and two rear wheels. The front wheel is a flywheel. A baby cart of this design must have the brake system set to stop the rear wheels. FIG. 1 shows a brake system used in a baby jogging stroller. According to this design, the brake system 92 has a brake pedal 921 for pressing by leg to stop the two rear wheels 91 of the baby jogging stroller. It is inconvenient and dangerous to operate this brake system when jogging.

The present invention has been accomplished under the circumstances in view. It is therefore one object of the present invention to provide a rear wheel synchronous brake system for pushcart, which is convenient to operate. It is another object of the present invention to provide a rear wheel synchronous brake system for pushcart, which is safe in use. It is still another object of the present invention to provide a rear wheel synchronous brake system for pushcart, which is suitable for use in a pushcart that has a front flywheel. To achieve these and other objects of the present invention, the rear wheel synchronous brake system comprises two rear brakes respectively coupled to the two rear wheels of the baby jogging stroller, a hand control unit mounted on the handle of the baby jogging stroller at the top, and two brake lines coupled between the brake lever of the hand control unit and the two rear brakes for driving the rear brakes to brake the two rear wheels of the baby jogging stroller synchronously when the user pulling the brake lever. When the user pulling the brake lever, the steel wires of the two brake lines are driven to move the rear brakes synchronously, thereby causing the rear brakes to brake the two rear wheels of the baby jogging stroller. On the contrary, when the user released the hand from the brake lever, the rear brakes are reversed by respective torsional springs to move the respective brake shoes away from the rear wheels. Because the brake system is operable by the hand control unit through the hand-operated brake lever, the brake system assures high safeness. The user can pull the brake lever with the hand to stop the cart instantly upon occurrence of an unexpected sudden condition during jogging.

DETAILED DESCRIPTION OF THE INVENTION

Figure 1:
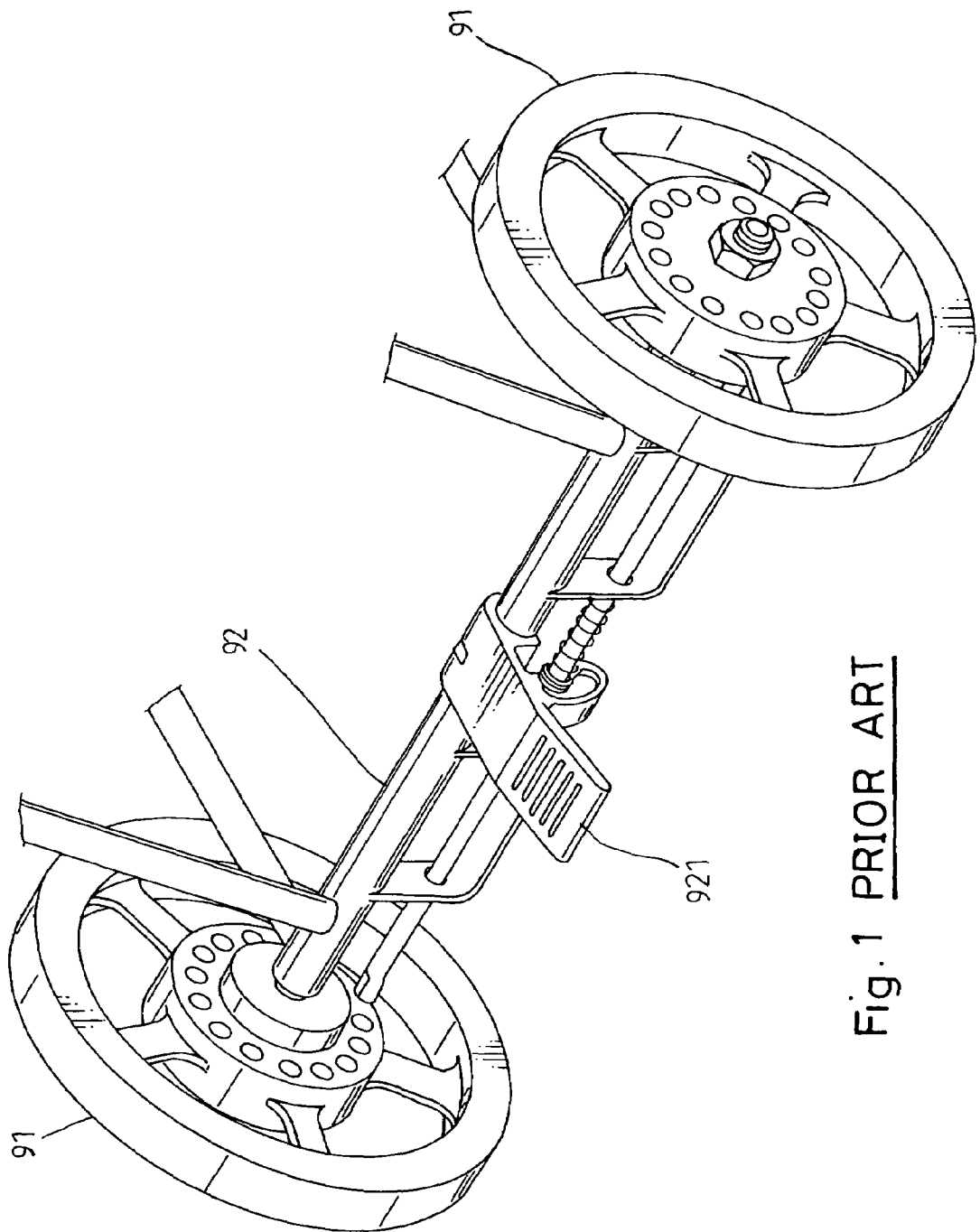
FIG. 1 is a perspective view of the rear part of a conventional pushcart.
Figure 2:
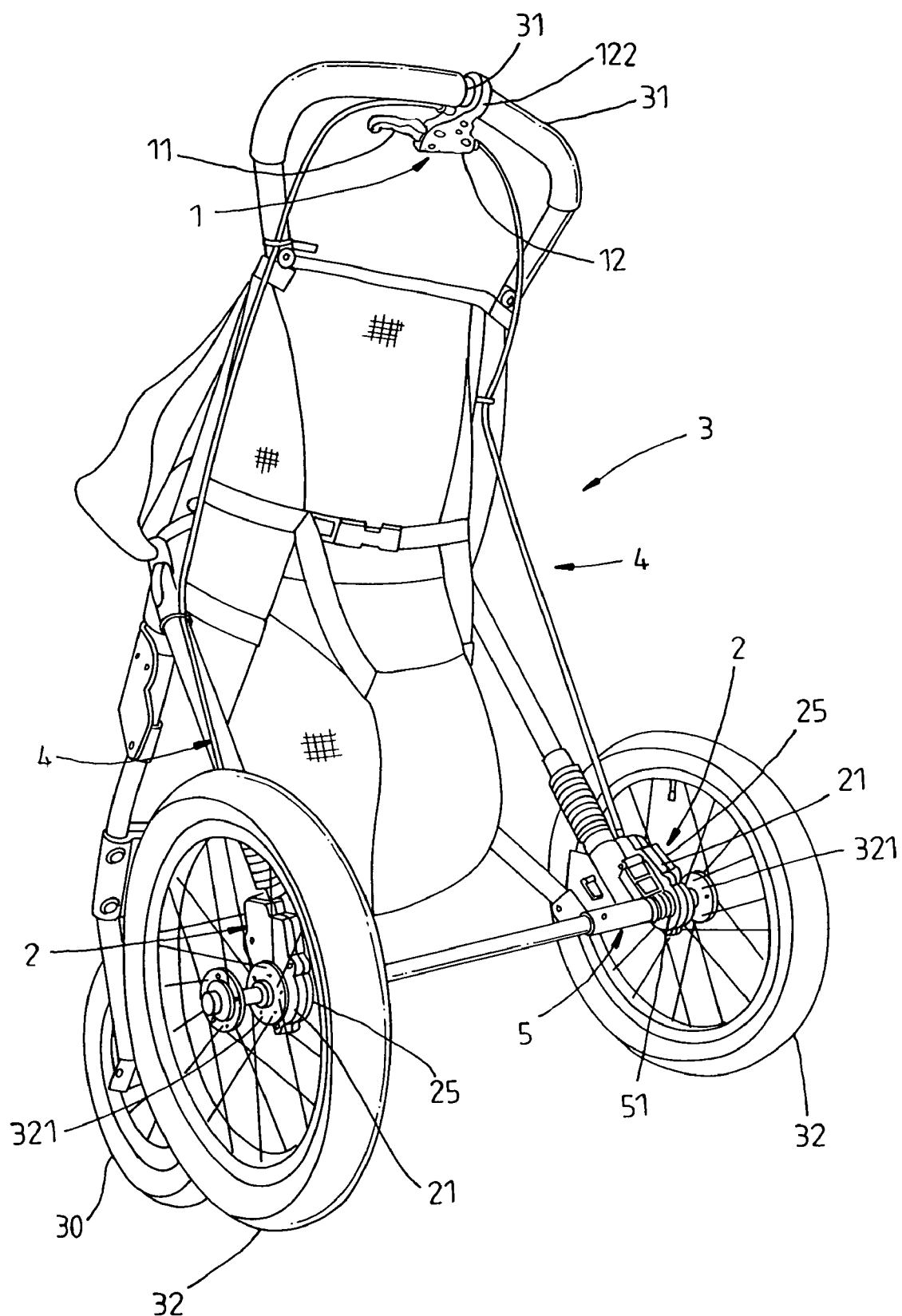
FIG. 2 is an elevational rear side view of a baby jogging stroller embodying the present invention.
Figure 3:
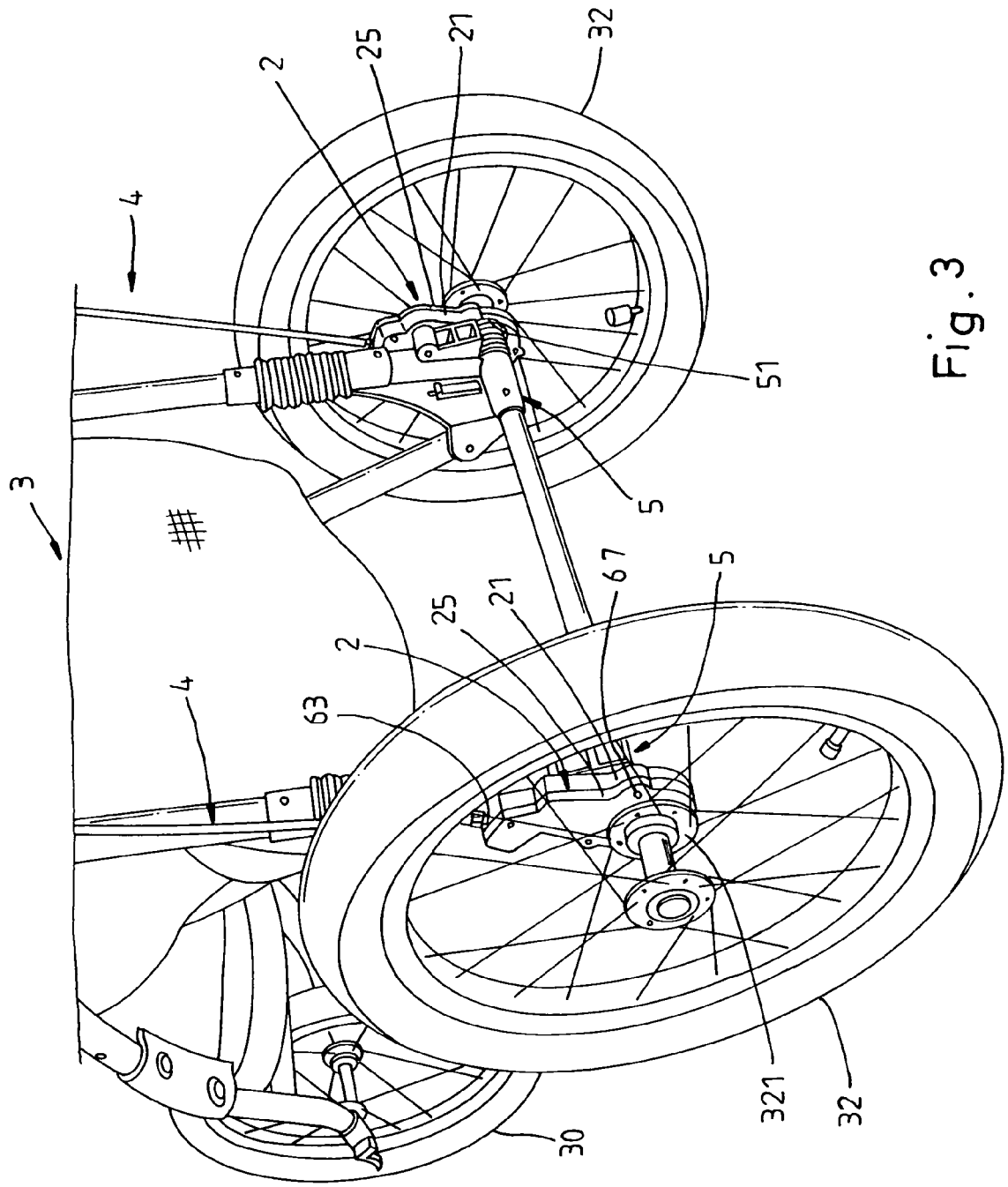
FIG. 3 is an enlarged view of the lower part of FIG. 2.
Figure 4:
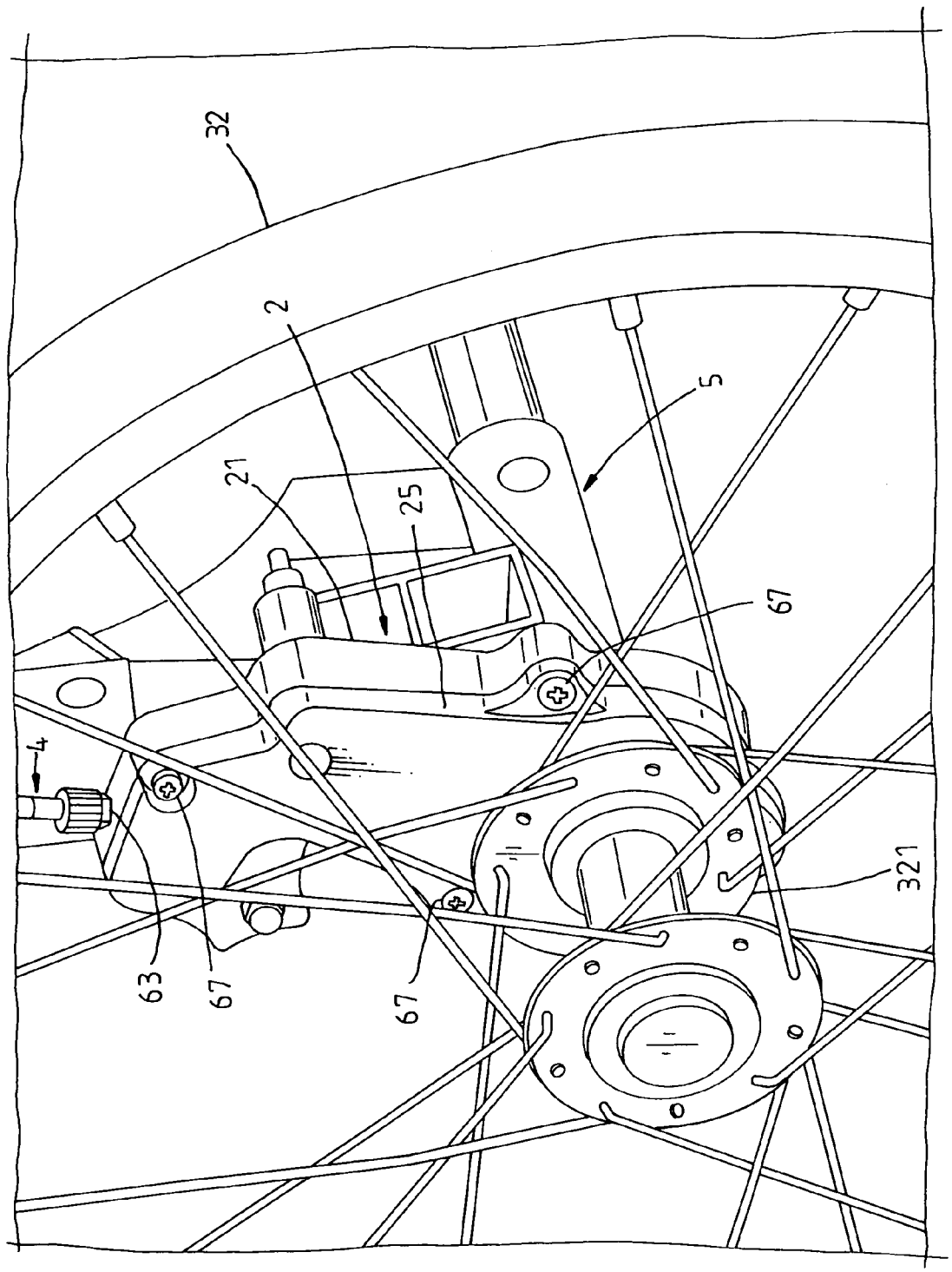
FIG. 4 is an enlarged view of a part of FIG. 3.
Figure 5:
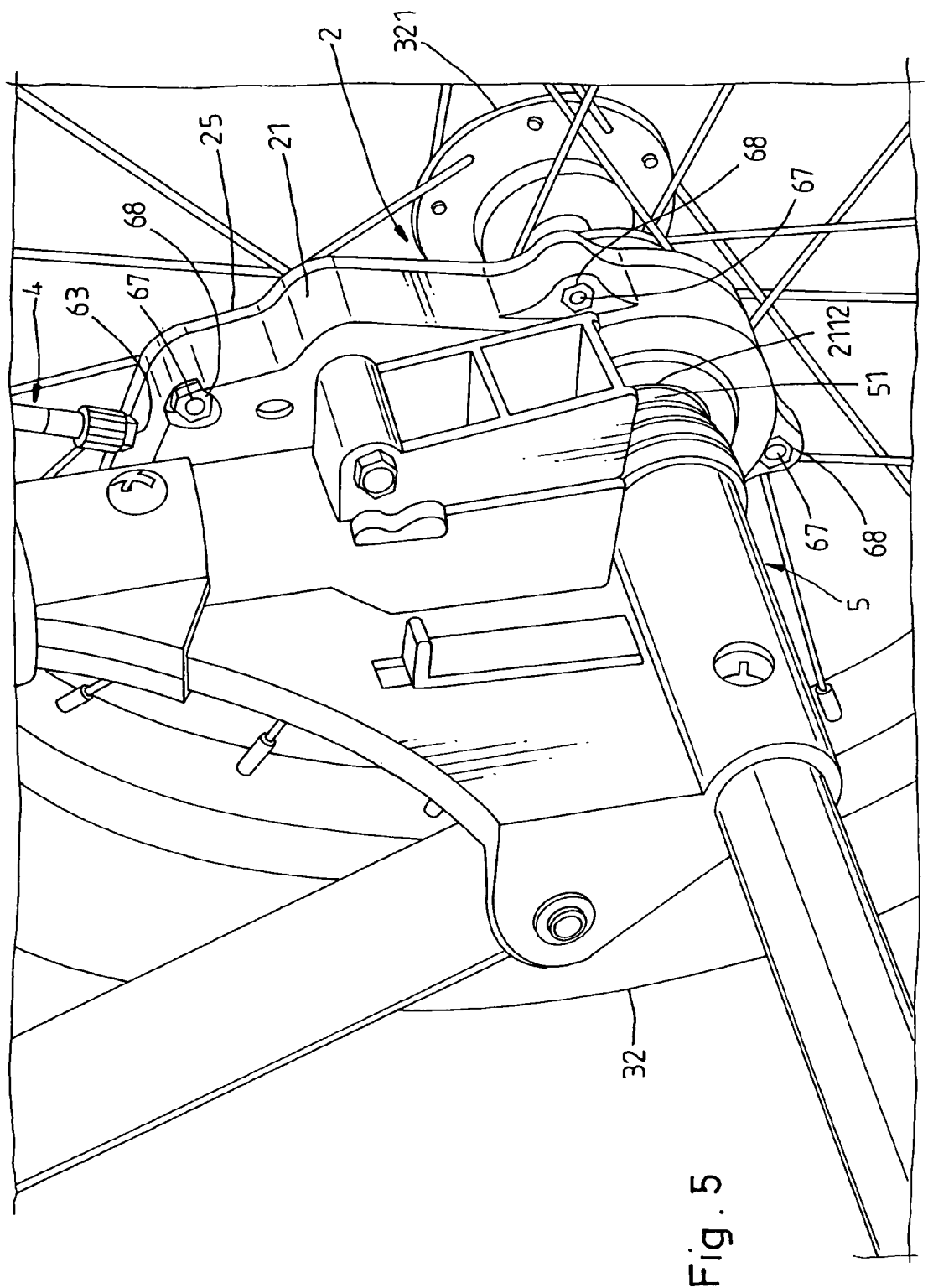
FIG. 5 is an enlarged view of another part of FIG. 3.
Figure 6:
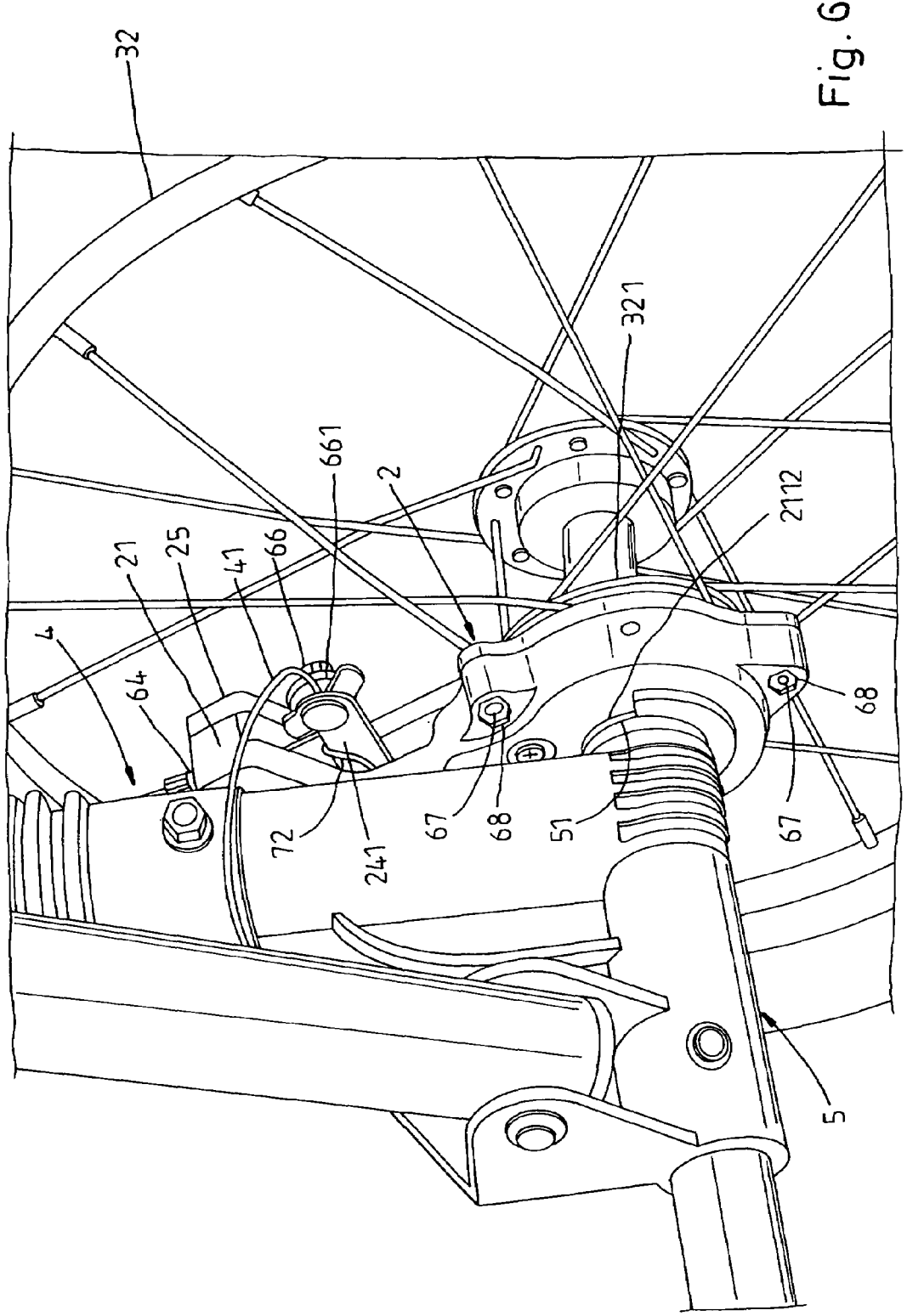
FIG. 6 is an enlarged view of still another part of FIG. 3.

Referring to FIGS. 2 and 3, a rear wheel synchronous brake system is shown used in a pushcart. According to this embodiment, the pushcart is a baby jogging stroller. The baby jogging stroller 3 comprises a front wheel 30, and two rear wheels 32. The rear wheel synchronous brake system comprises a hand control unit 1 and two rear brakes 2. The hand control unit 1 is installed in the handle 31 of the baby jogging stroller 3 at the top side. The hand control unit 1 comprises a brake lever 11 and two brake lines 4. The respective steel wires 41 of the brake lines 4 are respectively connected to the rear brakes 2. When the user pulls the brake lever 11, the steel wires 41 of the brake lines 4 are driven to move the rear brakes 2 against the rear wheels 32 respectively, thereby stopping the rear wheels 32. The rear wheels 32 have the respective hub 321 respectively mounted with a respective wheel axle 3211, which is supported in an axle hole 511 in an axle holder 51 at one end of a rear wheel holder 5 (see FIG. 7).

The main features of the present invention are outlined hereinafter. Each rear brake 2 is controlled to brake the brake shaft 3212 of the hub 321 of the respective rear wheel 32 (see FIGS. 3~9), comprising a base block 21, a locating frame 22, a brake shoe 23, a link 24, and a torsional spring 7.

The base block 21 has a bottom wall 211, a peripheral wall 212 perpendicularly extending around the border of the bottom wall 211, a mounting hole 2111 formed the bottom wall 211 near the top side (see FIG. 12), a coupling hole 2112 formed in the bottom wall 211 near the bottom side remote from the mounting hole 2111 and coupled to one axle holder 51 of the rear wheel holder 5 of the baby jogging stroller 3 (see FIGS. 4~10), and a side hole 2112 cut through the peripheral wall 212. A fastening member, for example, a pivot bolt 61 is mounted in the mounting hole 2111 of the base block 21 and inserted through the link 24 and the torsional spring 7 to secure the base block 21 to the rear wheel holder 5 of the baby jogging stroller 3. The bottom side of the bottom wall 211 is fastened to the brake shoe 23. The peripheral wall 212 has the top side thereof fastened to the locating frame 22.

Figure 9:
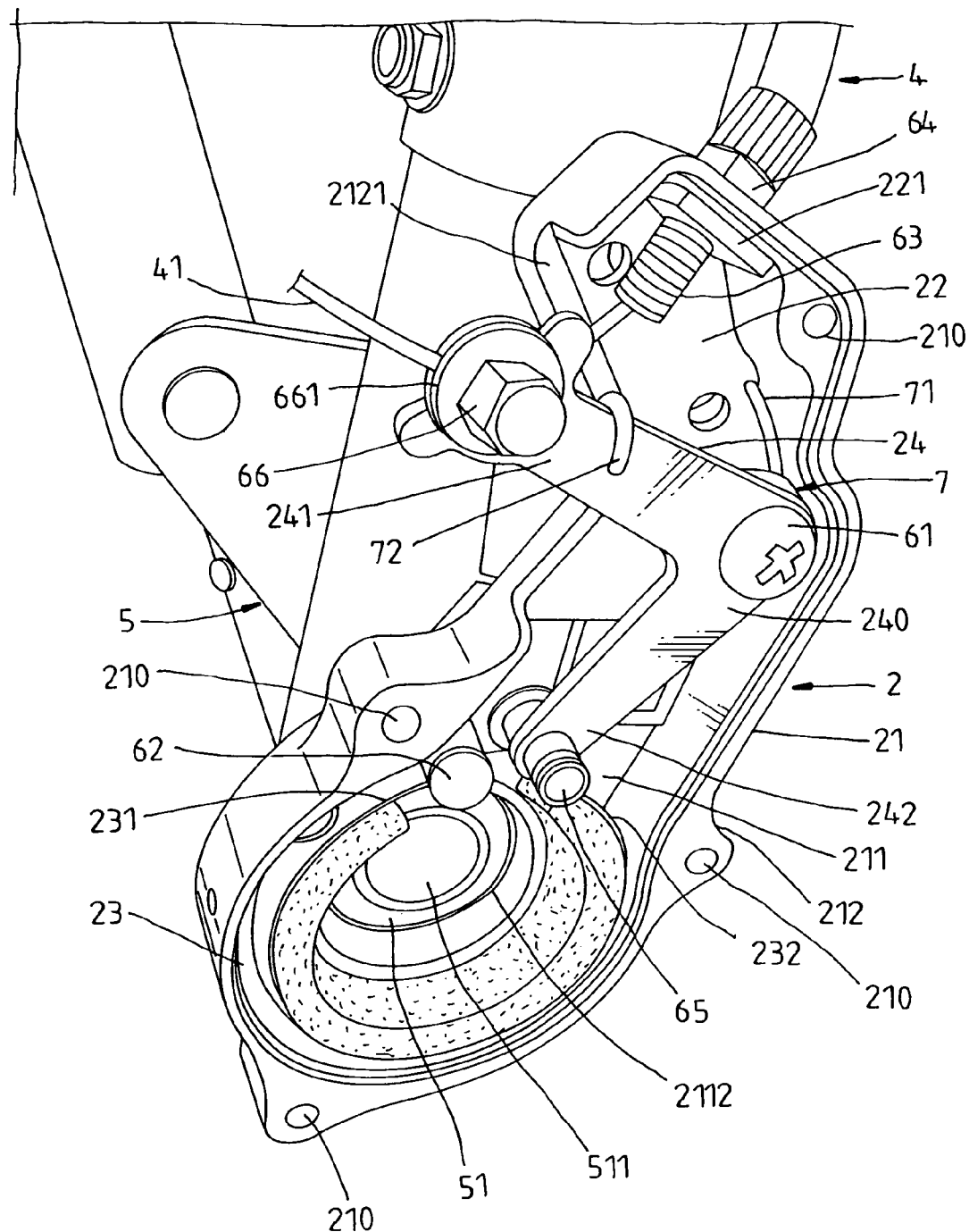
FIG. 9 is a perspective view of the rear wheel synchronous brake system after removal of the cover according to the present invention.
Figure 10:
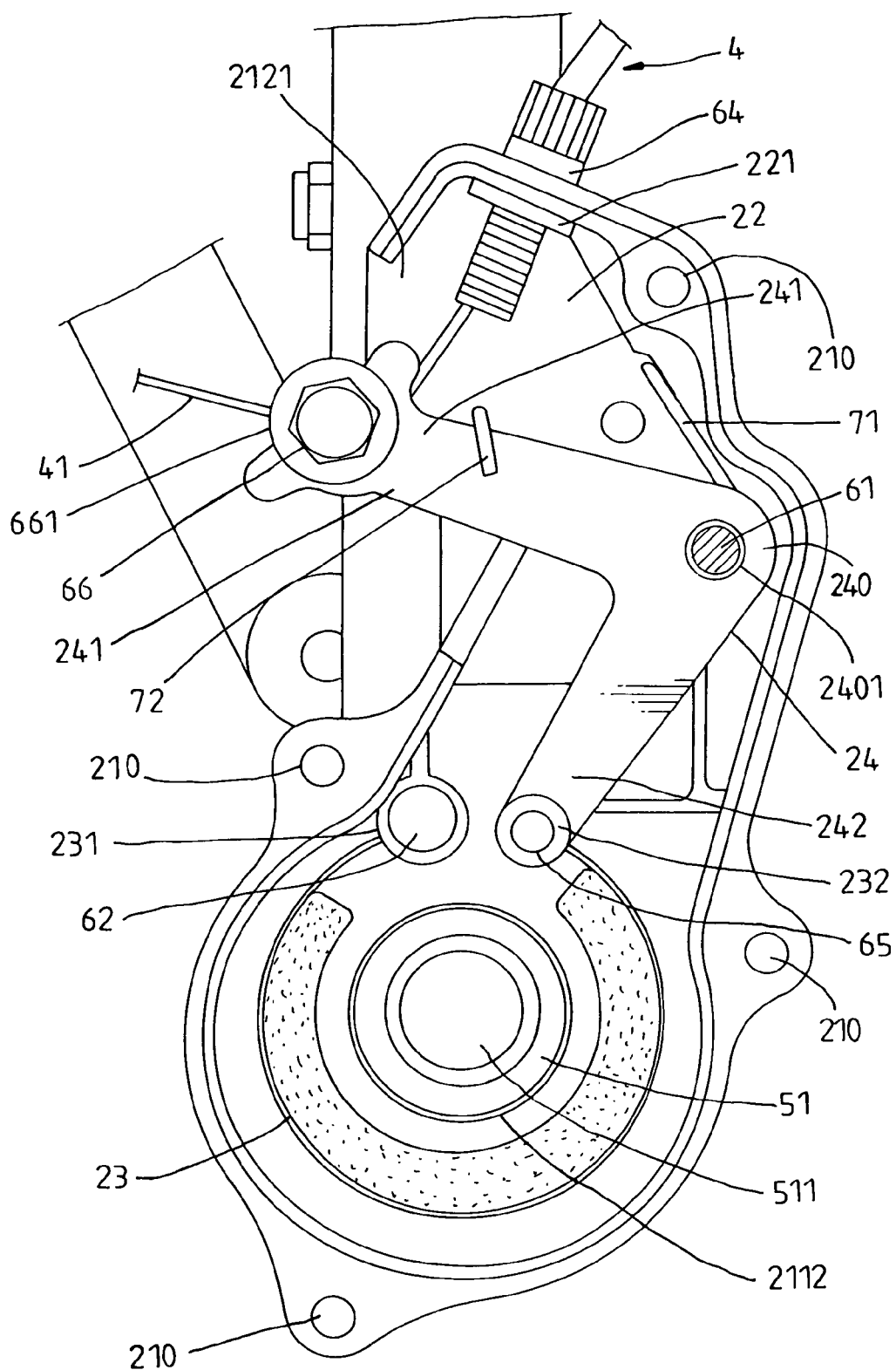
FIG. 10 is a plain view showing the non-braking status of the rear wheel synchronous brake system according to the present invention.

The locating frame 22 has one side 221 fastened to the top side of the peripheral wall 212 with a hollow screw 63 and a nut 64 (see FIGS. 9 and 10). The steel wire 41 of one of the aforesaid brake lines 4 is inserted through the hollow screw 63 into the inside of the base block 21.

The brake shoe 23 is shaped like a split ring (see FIGS. 9 and 10), having a first end 231 fastened to the bottom side of the bottom wall 211 of the base block 21 with a fastening member 62, and a second end 232 fastened to the link 24.

The link 24 is a substantially V-shaped bar, having a first arm 241 fastened to one end of the steel wire 41 of one of the aforesaid two brake lines 4 with a screw 66 and a washer 661, a second arm 242 fastened to the second end 232 of the brake shoe 23 with a fastening member 65, a middle connecting portion 240 joining one end of the first arm 241 and one end of the second arm 242 (see FIGS. 9 and 10), and a pivot hole 2401 cut through the middle connecting portion 240 and coupled to the pivot bolt 61 in the mounting hole 2111 of the base block 21.

The torsional spring 7 has one end 71 hooked on the locating frame 22, and the other end 72 hooked on the first arm 241 of the link 24.

Figure 11:
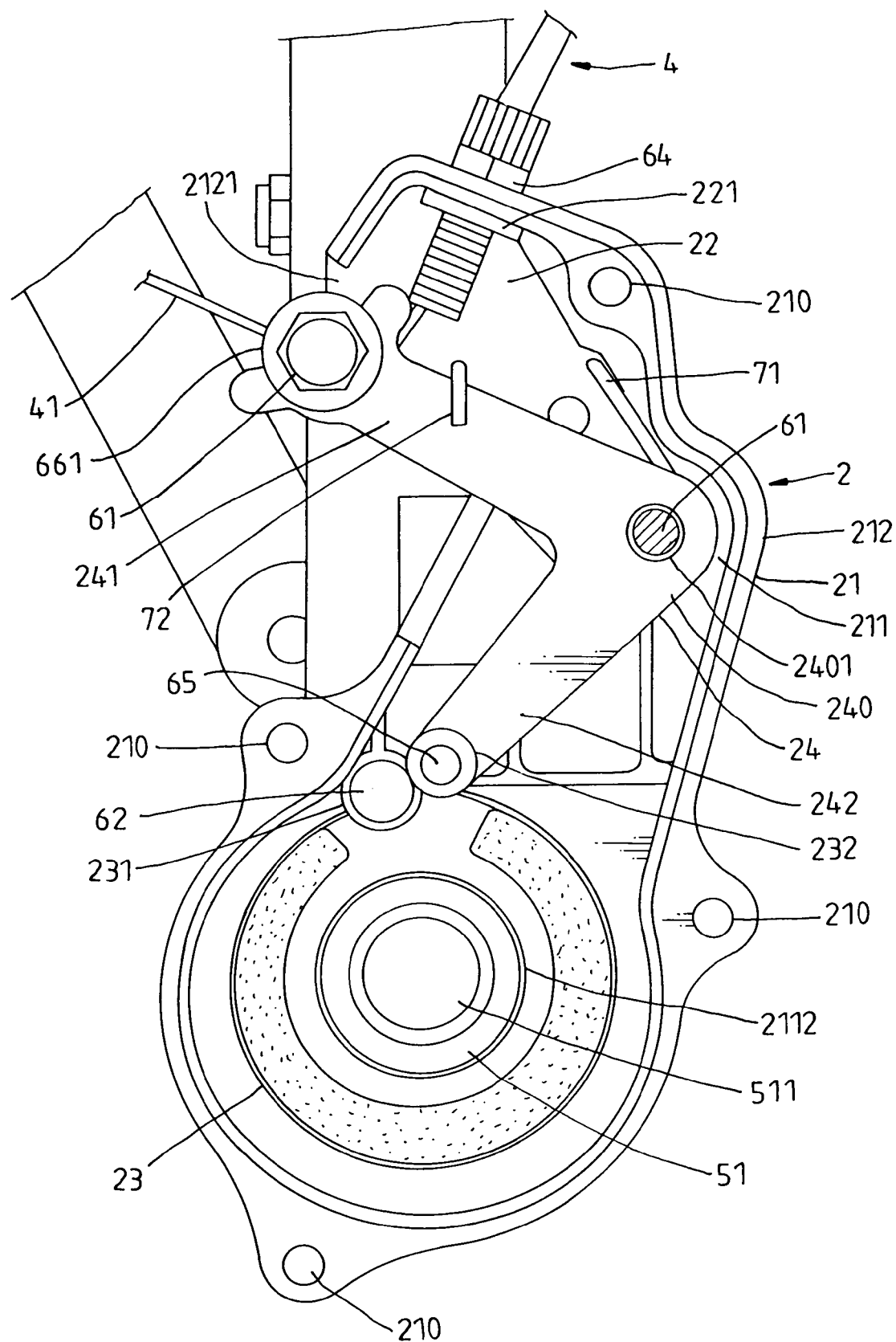
FIG. 11 is a plain view showing the braking status of the rear wheel synchronous brake system according to the present invention.

When the user pulls the brake lever 11 of the hand control unit 1, the steel wires 41 of the brake lines 4 are driven to move the first arm 241 of the link 24 of each of the rear brakes 2 and to further bias the links 24 of the two rear brakes 2, thereby causing the second arm 242 of the link 24 of each rear brake 2 to move the second end 232 of the brake shoe 23 of the respective rear brake 2 toward the first end 231 of the respective brake shoe 23 to brake the brake shaft 3121 of the hub 321 of the respective rear wheel 32 (see FIG. 11), and therefore the rear wheels 32 are stopped. On the contrary, when the user released the brake lever 11, the torsional spring 7 reverses the link 24 of the respective rear brake 2 to move the second end 232 of the brake shoe 23 of the respective rear brake 2 away from the first end 231 of the respective brake shoe 23 (see FIG. 10), and therefore the brake action is released.

Figure 7:
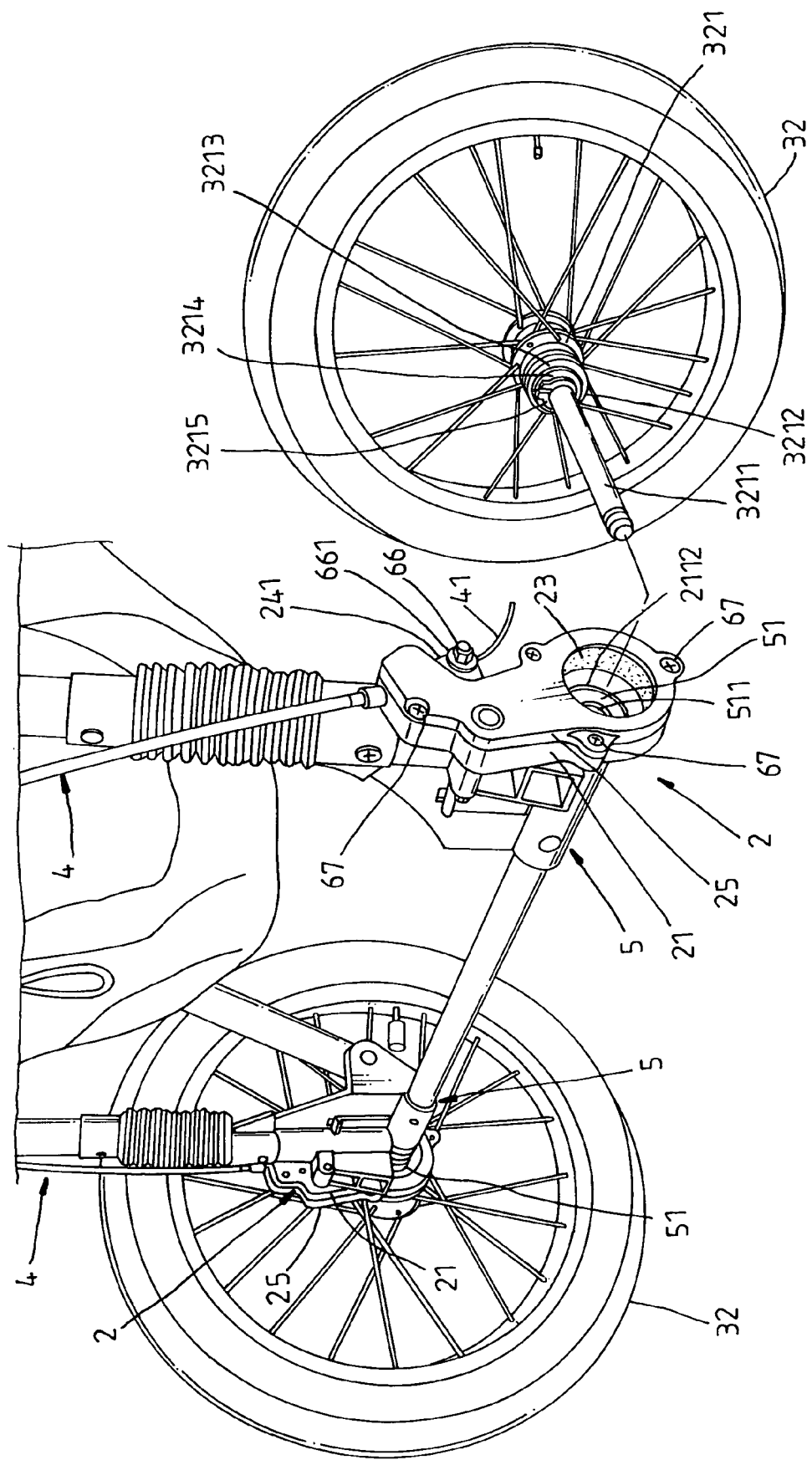
FIG. 7 is an exploded view of the present invention.
Figure 8:
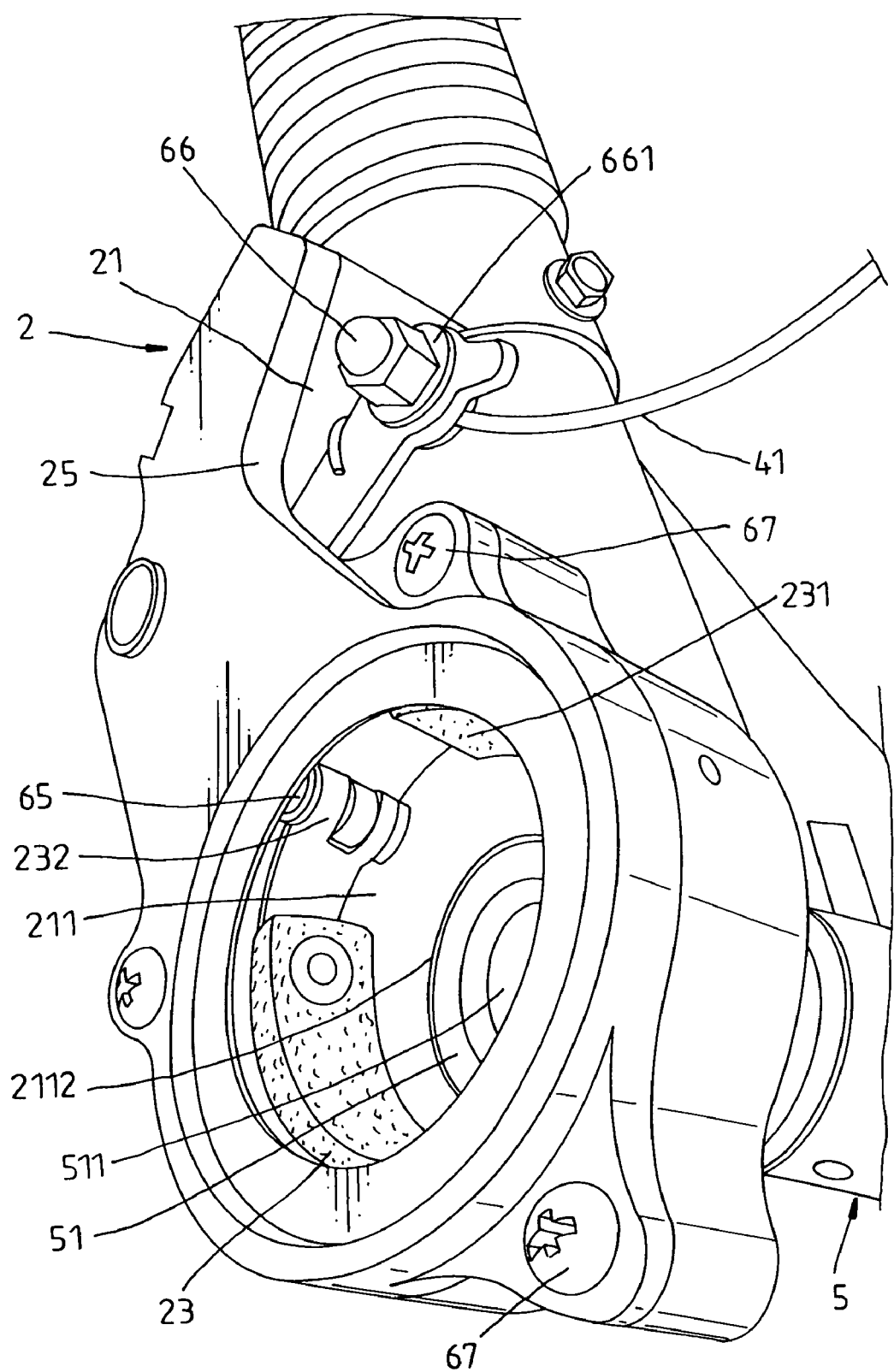
FIG. 8 is a perspective view of the rear wheel synchronous brake system according to the present invention.

Referring to FIG. 7, the brake shaft 3212 of the hub 321 of each rear wheel 32 has a rough surface to enhance the braking effect. The brake shaft 3212 is secured to the respective wheel axle 3211 by a C-shaped clamp 3215, having an axially extending axle hole 3213 and an axle bearing 3214 mounted in the axle hole 3213 to support the wheel axle 3211.

Referring to FIG. 9, the base block 21 of each rear brake 2 further has a plurality of locating holes 210 for the mounting of a cover 25. The cover 25 has a plurality of locating holes 250 respectively fastened to the locating holes 210 of the base block 21 with fastening members 67, 68 (see FIG. 5), and a through hole 251 for the passing of the brake shaft 3212 of the respective rear wheel 32.

Referring to FIGS. 14~18, the hand control unit 1 is comprised of the aforesaid brake lever 11, a holder frame 12, and the aforesaid two brake lines 4.

The holder frame 12 has a coupling block 121 extended from one end thereof, a clamping plate 122 pivotally connected to the free end of the coupling block 121 with a pivot 1211 and secured with the coupling block 121 to the handle 31 of the baby jogging stroller 3 by a tightening up screw 1221, a receiving chamber 120 transversely disposed at the other end remote from the coupling block 121 for receiving the brake lever 11, three pivot holes, namely, the first pivot hole 1231, the second pivot hole 1232 and the third pivot hole 1233 respectively perpendicularly extending from the receiving chamber 120 to the outside wall (see FIG. 15), a pulley 127 mounted in the receiving chamber 120 and pivotally connected to the third pivot hole 1233 with a pivot 1271 for guiding the steel wire 411 of one of the two brake lines 4, and two brackets 1281, 1282 respectively fixedly provided at two opposite sides to hold the brake lines 4 in place.

The brake lever 11 has a coupling block 114 extended from one end thereof, namely, the front end and inserted into the receiving chamber 120 of the holder frame 12 and pivotally connected to the second pivot hole 1232 with a pivot 1242, a crevice 112 transversely disposed in the front end, an elongated sliding slot 110 extending across the crevice 112 and pivotally coupled to the first pivot hole 1231 inside the receiving chamber 120 of the holder frame 12 with a rivet 1241 and a spring member 125, and two locating pins, namely, the first locating pin 111 and the second locating pin 113 respectively set in the crevice 112.

The steel wire 41 of one of the brake lines 4 has one end 411 inserted through one bracket 1281 and fastened to the first locating pin 111 of the brake lever 11, and the other end connected to one of the aforesaid two rear brakes 2. The steel wire 41 of the other end of the brake lines 4 has one end 412 inserted through the other bracket 1282 and extending over the pulley 127 in the receiving chamber 120 of the holder frame 12 and then fastened to the second locating pin 113 of the brake lever 11, and the other end connected to the other one of the aforesaid two rear brakes 2.

Figure 12:
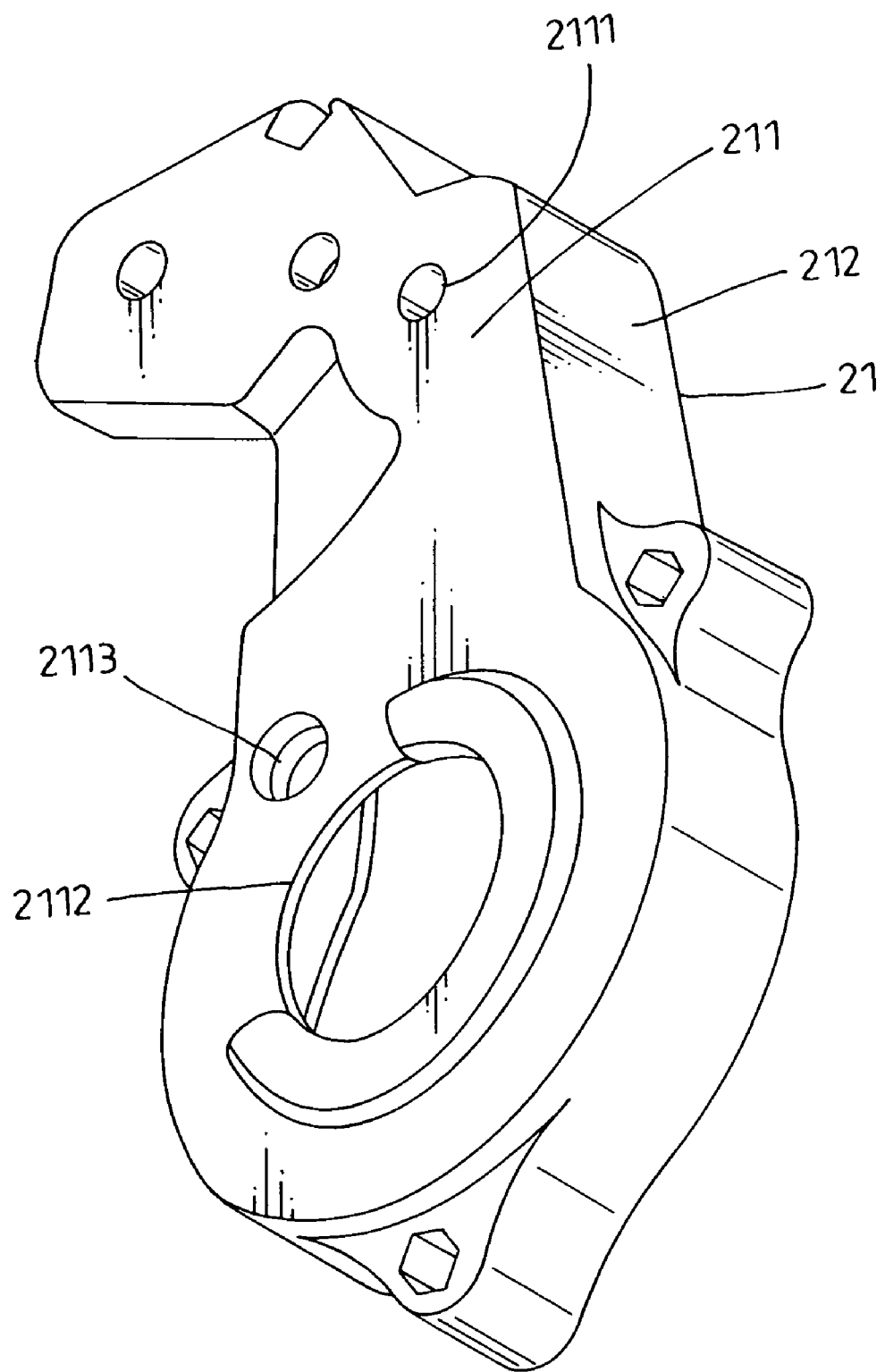
FIG. 12 is an elevational rear side view of the base block of one rear brake of the rear wheel synchronous brake system according to the present invention.
Figure 13:
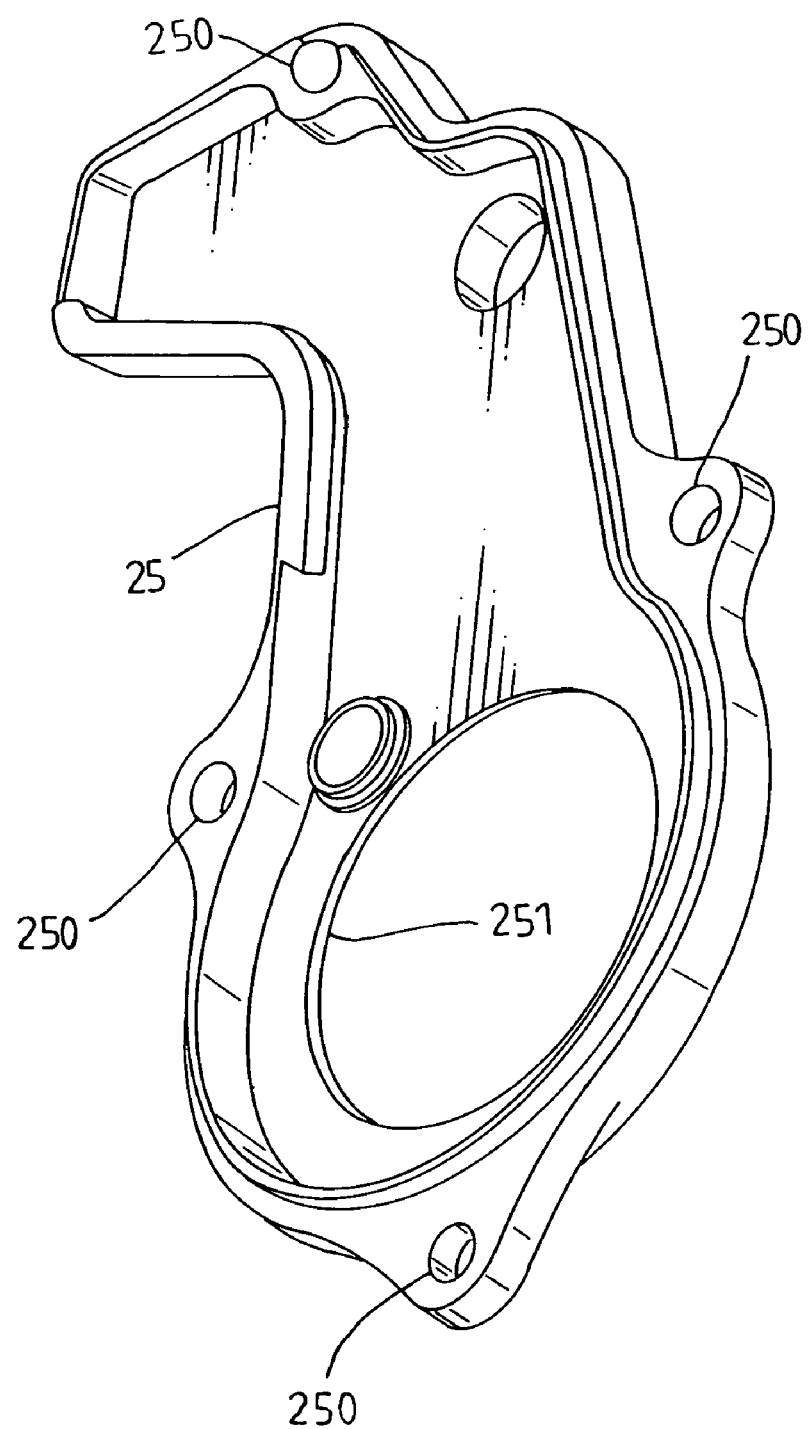
FIG. 13 is an elevational rear side view of the cover of the rear wheel synchronous brake system according to the present invention.
Figure 14:
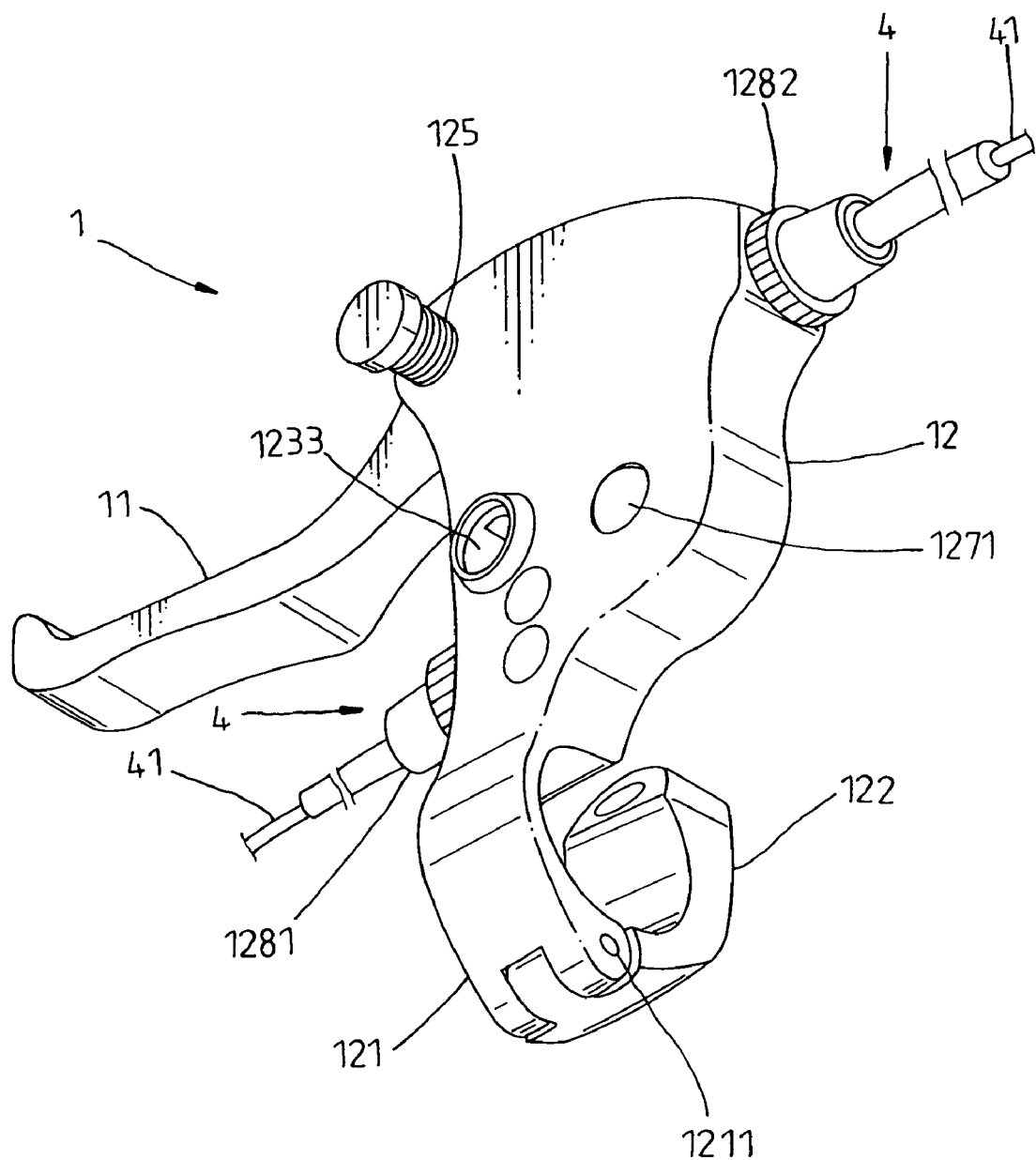
FIG. 14 is an elevational view of the hand control unit of the rear wheel synchronous brake system according to the present invention.
Figure 15:
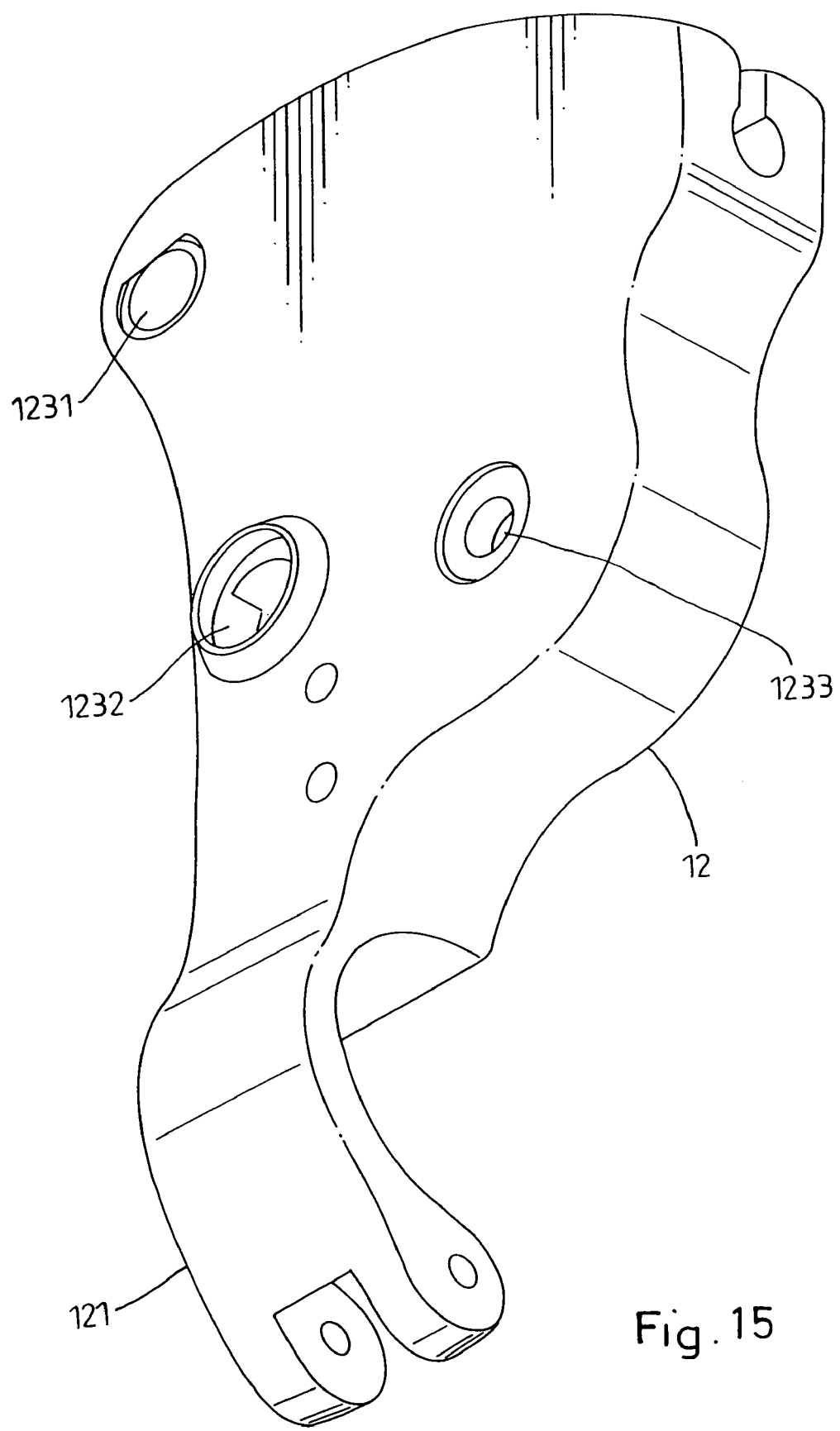
FIG. 15 is an enlarged view of the locating block of the hand control unit of the rear wheel synchronous brake system according to the present invention.
Figure 16:
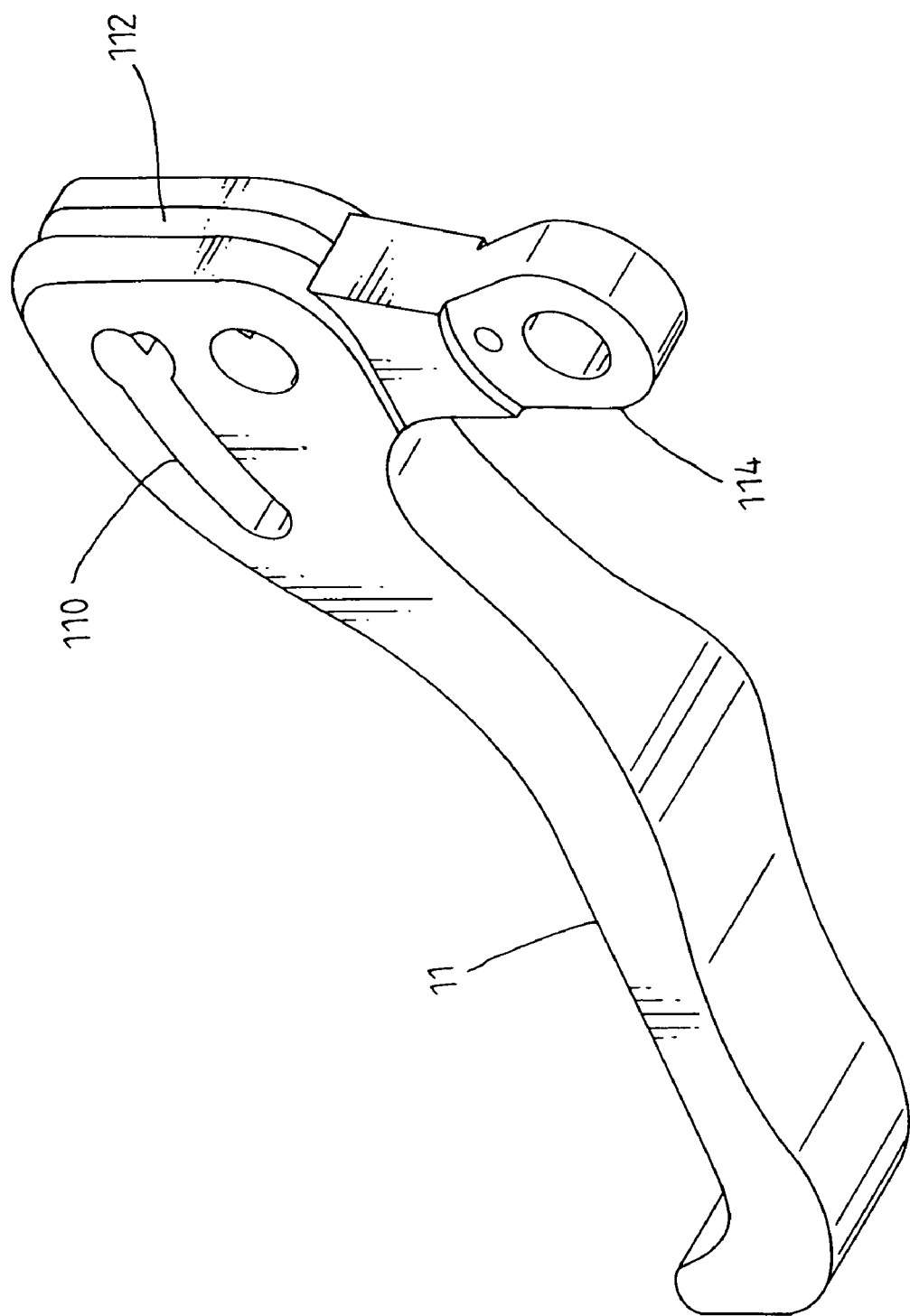
FIG. 16 is an enlarged view of a brake lever of the hand control unit of the rear wheel synchronous brake system according to the present invention.
Figure 17:
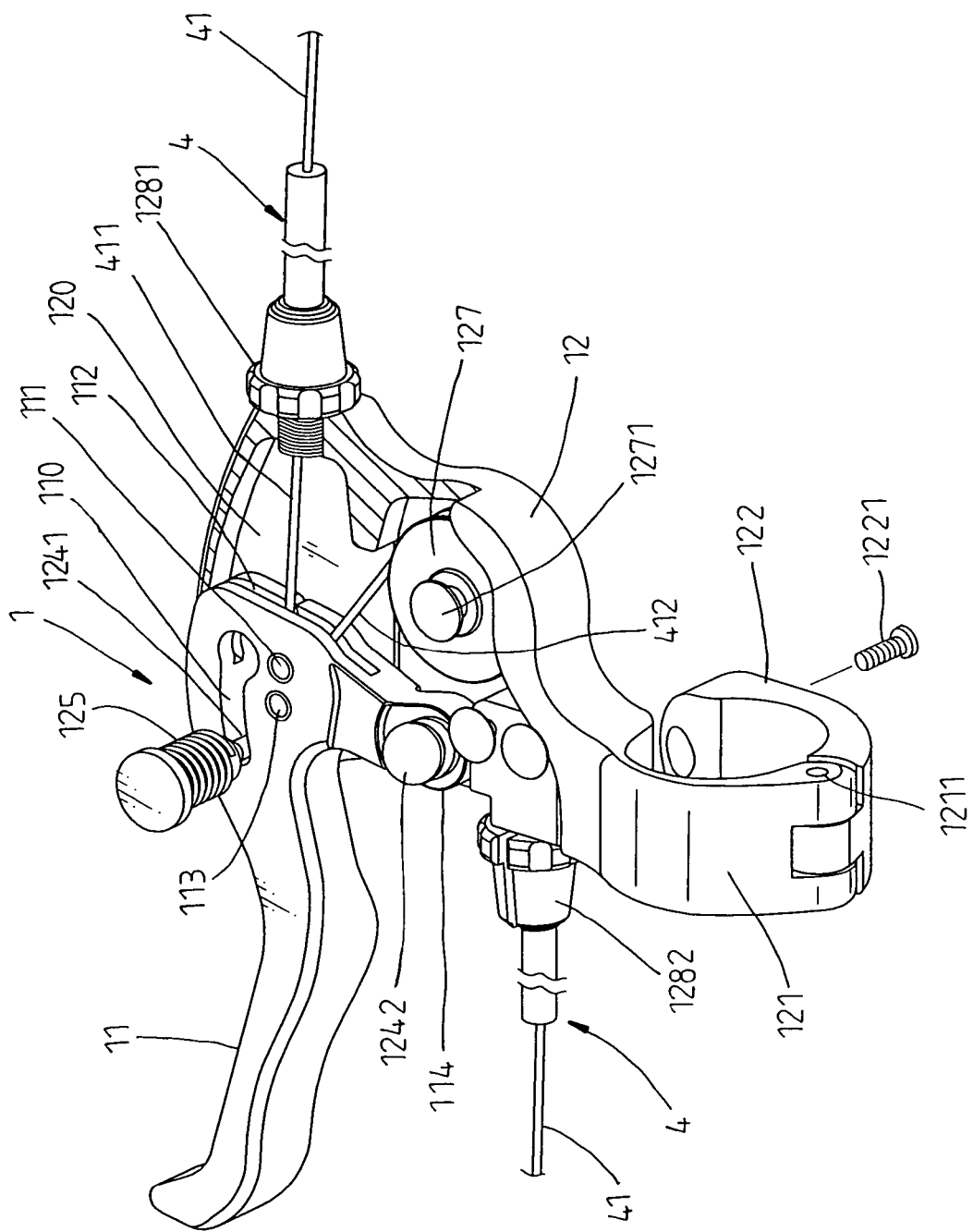
FIG. 17 is an elevational cutaway view of the hand control unit of the rear wheel synchronous brake system according to the present invention.
Figure 18:
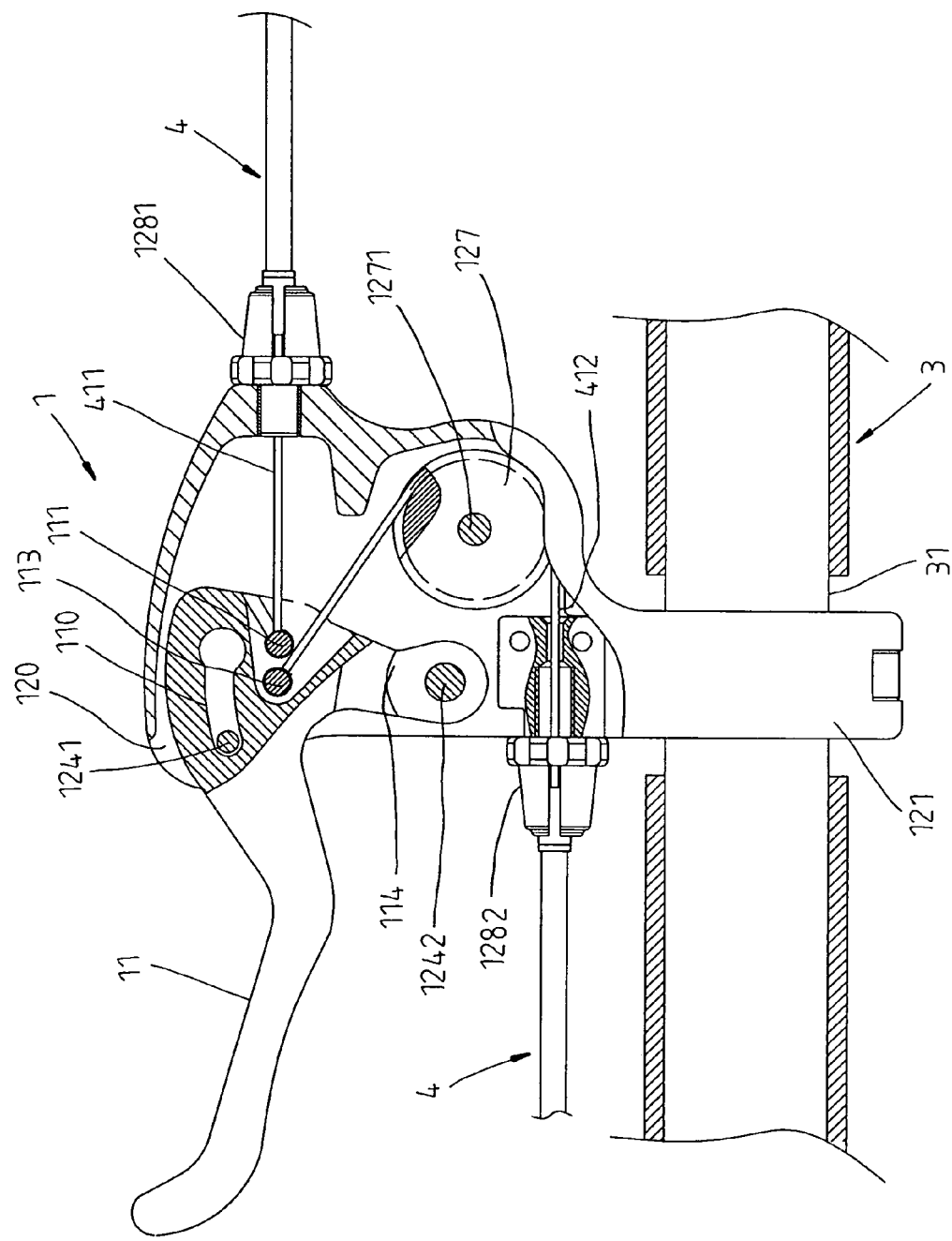
FIG. 18 is a sectional plain view of the hand control unit of the rear wheel synchronous brake system according to the present invention.
Figure 19:
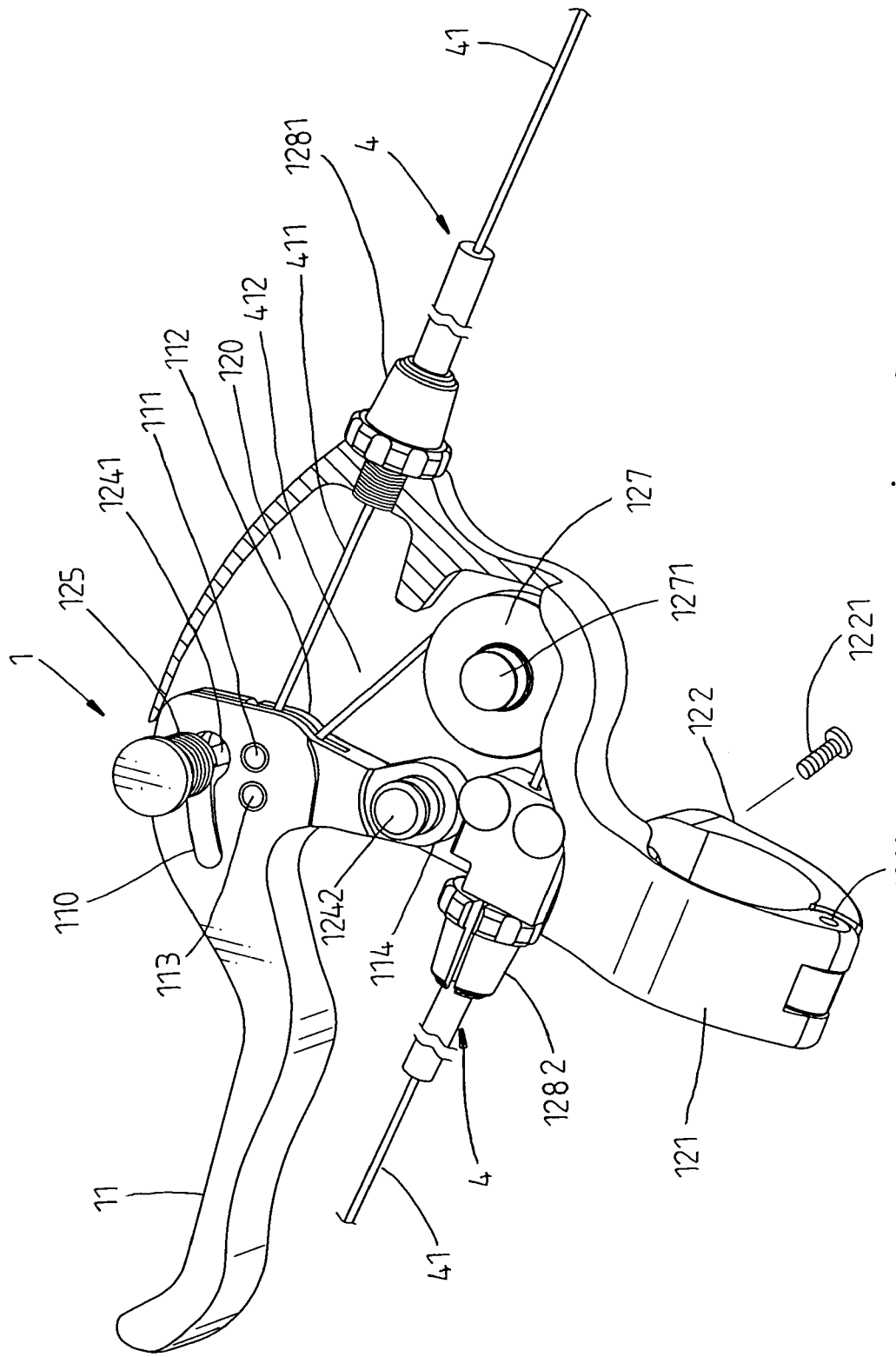
FIG. 19 is a schematic perspective view showing the brake status of the hand control unit of the rear wheel synchronous brake system according to the present invention.
Figure 20:
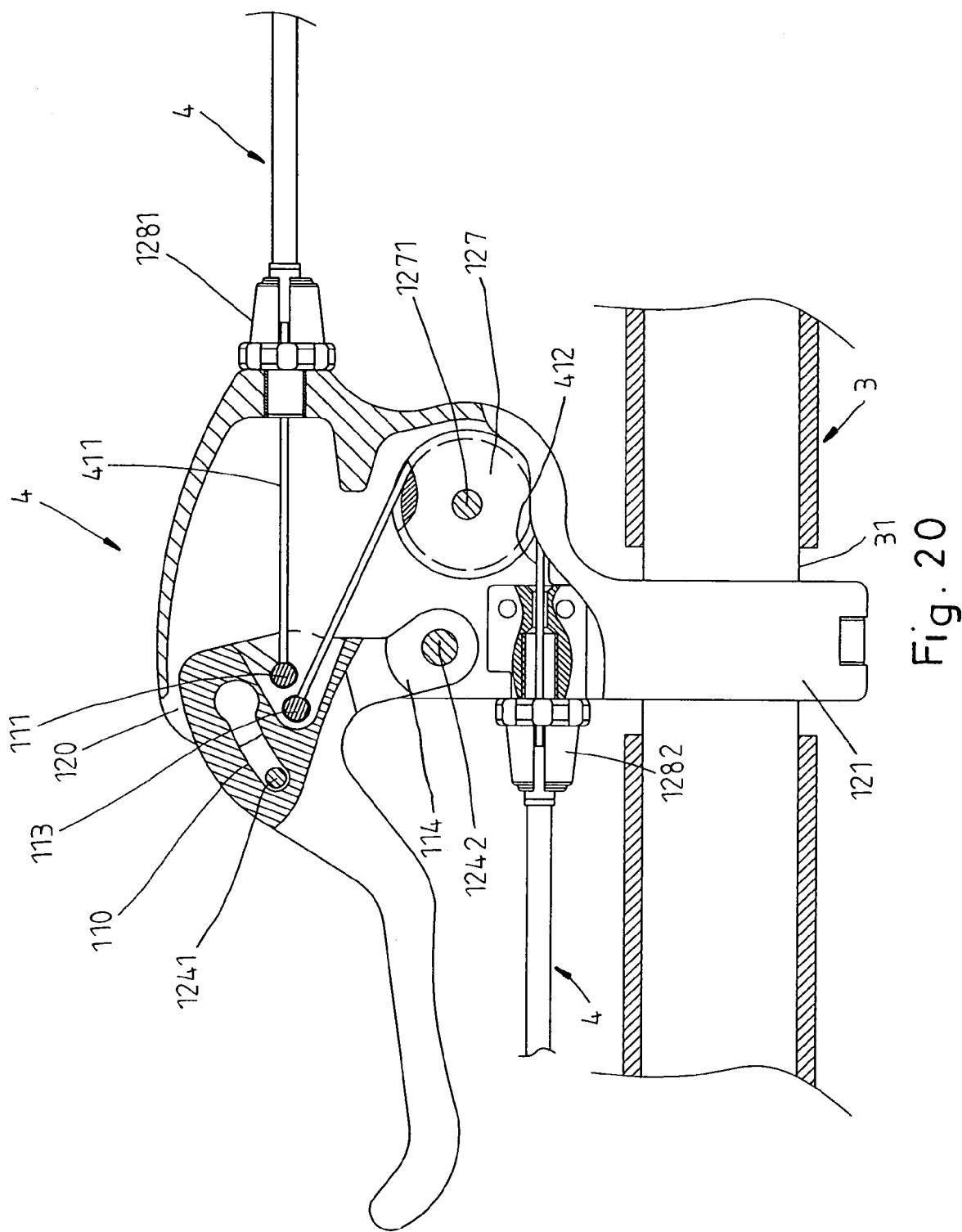
FIG. 20 is a sectional plain view showing the brake status of the hand control unit of the rear wheel synchronous brake system according to the present invention.

Referring to FIG. 12, the base block 21 further has a locating hole 2113 formed in the bottom wall 211 and fastened to the first end 231 of the brake shoe 23 with a fastening member 62.

As indicated above, the rear wheel synchronous brake system of the present invention has the following advantages:

1. Ease of operation: When wishing to stop the cart, the user needs only to pull the brake lever 11 of the hand control unit 1. When pulling the brake lever 11, the steel wires 41 of the brake lines 4 are driven to bias the links 24 of the rear brakes 2, thereby causing the brake shoes 23 of the rear brakes 2 to brake the brake shafts 3121 of the hubs 321 of the rear wheels 32 synchronously; on the contrary, when the user released the brake lever 11, the respective torsional springs 7 reverse the links 24 of the rear brakes 2 respectively, thereby releasing the brake shoes 23 of the respective rear brakes 2 from the brake shafts 3121 of the hubs 321 of the rear wheels 32 respectively.

2. High safeness: Because the rear wheel braking operation is controlled by hand through the brake lever 11, the user can pull the brake lever 11 with the hand to stop the cart instantly upon occurrence of an unexpected sudden condition during jogging.

3. The rear wheel synchronous brake system is practical for use in a baby jogging stroller, which is equipped with a flywheel type front wheel.

Although a particular embodiment of the present invention has been described in detailed for purposes of illustration, various modifications and enhancements may be made without departing from the spirit and scope of the invention. Accordingly, the invention is not to be limited except as by the appended claims.

What is claimed is:

1. A rear wheel synchronous brake system installed in a pushcart having two rear wheels for operation by hand to stop said rear wheels, the rear wheel synchronous brake system comprising two rear brakes adapted to brake said rear wheels respectively, a hand control unit mounted on a top side of a handle of said pushcart, and two brake lines respectively connected between said hand control unit and said rear brakes, said brake lines each having a steel wire controllable by said hand control unit to move said rear brakes to brake said rear wheels synchronously, said rear wheels each having a hub, a wheel axle mounted in said hub and supported in an axle hole in one of two axle holders at two ends of a rear wheel holder of said pushcart, wherein said rear brakes are controlled by said hand control unit to brake the brake shafts of the hubs of said rear wheel synchronously, each comprising:

a base block, said base block having a bottom wall, a peripheral wall perpendicularly extending around the border of said bottom wall, a mounting hole formed in said bottom wall and pivoted to said rear wheel holder of said pushcart, a coupling hole formed in said bottom wall remote from said mounting hole and coupled to one axle holder of said rear wheel holder of said pushcart, and a side hole cut through said peripheral wall;

a locating frame, said locating frame having one side thereof fastened to a top side of the peripheral wall of said base block with a hollow screw and a nut, said hollow screw guiding the steel wire of one of said brake lines to the inside of said base block;

a brake shoe shaped like a split ring, said brake shoe having a first end fastened to said bottom wall of said base block and a second end;

a link, said link having a first arm fastened to one end of the steel wire of one of said two brake lines, a second arm fastened to the second end of said brake shoe, a middle connecting portion joining one end of said first arm and one end of said second arm, and a pivot hole cut through said middle connecting portion and pivotally connected to the mounting hole of said base block; and a torsional spring, said torsional spring having a first end hooked on said locating frame and a second end hooked on the first arm of said link.

2. The rear wheel synchronous brake system as claimed in claim 1, wherein the brake shaft of the hub of each of said rear wheels is secured to the respective wheel axle by a C-shaped clamp, having a rough surface, an axially extending axle hole, and an axle bearing mounted in said axle hole to support the wheel axle.

3. The rear wheel synchronous brake system as claimed in claim 1, wherein the base block of each of said two rear brakes is covered with a cover and has a plurality of locating holes for the mounting of the cover, said cover having a plurality of locating holes respectively fastened to the locating holes of the respective base block with fastening members and a through hole for the passing of the brake shaft of the respective rear wheel.

4. The rear wheel synchronous brake system as claimed in claim 1, wherein the base block of each of said two rear brakes has a locating hole formed in the bottom wall thereof and fastened to the first end of the brake shoe of the respective rear brake with a fastening member.

5. The rear wheel synchronous brake system as claimed in claim 1, wherein said hand control unit comprises:

a holder frame, said holder frame comprising a coupling block extended from one end thereof, a clamping plate pivotally connected to said coupling block with a pivot and secured with said coupling block to the handle of said pushcart by a tightening up screw, a receiving chamber transversely disposed at one end thereof remote from said coupling block, a first pivot hole and a second pivot hole and a third pivot hole respectively perpendicularly extending to said receiving chamber, a pulley mounted in said receiving chamber and pivotally connected to said third pivot hole with a pivot for guiding the steel wire of one of said two brake lines, and two brackets respectively fixedly provided at two opposite sides to hold said brake lines in place;

a brake lever, said brake lever having a coupling block extended from one a front end thereof and inserted into the receiving chamber of said holder frame and pivotally connected to the second pivot hole of said holder frame with a pivot, a crevice transversely disposed in the front end, an elongated sliding slot extending across said crevice and pivotally coupled to said first pivot hole inside said receiving chamber of said holder frame with a rivet and a spring member, and a first locating pin and a second locating pin respectively set in said crevice; and said two brake lines, the steel wire of one of said two brake lines having one end inserted through one of said two brackets and fastened to the first locating pin of said brake lever and an opposite end connected to one of said two rear brakes, the steel wire of the other end of said two brake lines having one end inserted through the other of said two brackets and extending over said pulley in the receiving chamber of said holder frame and then fastened to the second locating pin of said brake lever and an opposite end connected to the other one of said two rear brakes.

* * * * *